Sept. 10, 1968  W. B. LLOYD ETAL  3,400,541
MANIPULATOR APPARATUS
Filed Nov. 23, 1966
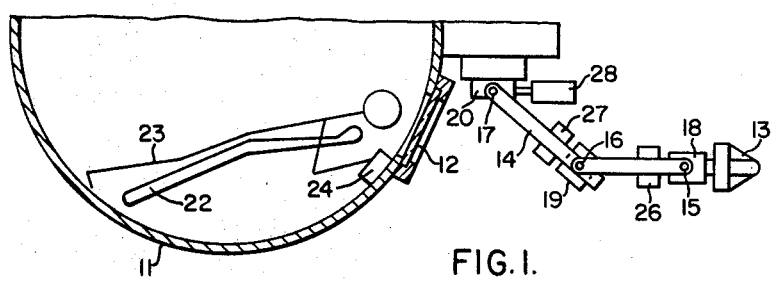
FIG. 1.
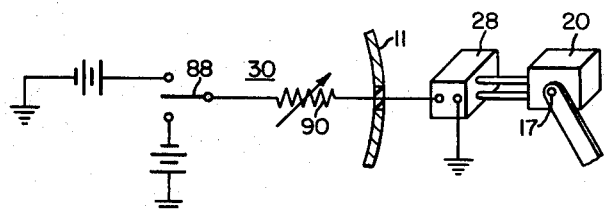
FIG. 2.
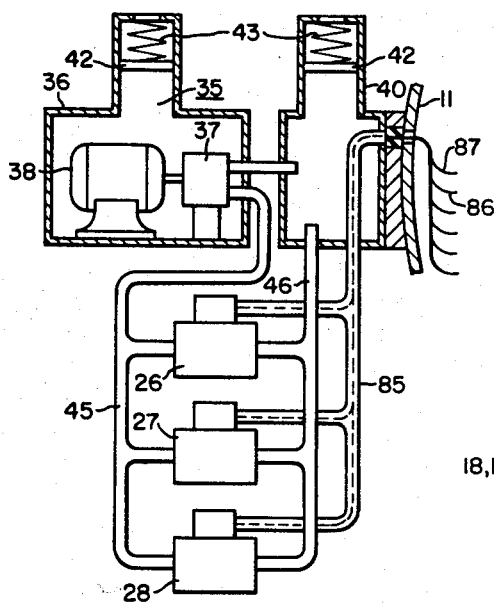
FIG. 3.
FIG. 4.
WITNESSES
Theodore F. Wrobel
James F. Young
INVENTORS
Wayne B. Lloyd and
Earl R. Schlissler
BY
W. F. Straitiff
AGENT

United States Patent Office 3,400,541
Patented Sept. 10, 1968

3,400,541
MANIPULATOR APPARATUS
Wayne B. Lloyd, Baltimore, and Earl R. Schlissler, Towson, Md., assignors to Westinghouse Electric Corporation, Pittsburgh, Pa., a corporation of Pennsylvania
Filed Nov. 23, 1966, Ser. No. 596,627
4 Claims. (Cl. 61—69)

ABSTRACT OF THE DISCLOSURE

Manipulator apparatus for use on undersea vehicles. An exterior-mounted multi-joint manipulator arm has a respective hydraulic actuator and electro-hydraulic flow control valve at each arm joint. Common hydraulic supply and return lines connect the several control valve to a sea-ambient pressure-compensated hydraulic supply-return system. Current regulating means at an operator's station provides for operation of the control valves, and means are included for equalizing all hydraulic volumes within the system at sea-ambient-compensated pressures during de-activation of the apparatus.

---

Powered manipulators mounted on the exterior of the hull of space and undersea vehicles are employed for grasping and manipulating objects at the exterior under the control of an operator inside who has visual contact with the manipulator and the object to be grasped or manipulated. A typical manipulator to which the present invention relates is generally a simplified mechanical simulation of a human arm and includes the grasping means, mechanical arm sections, and pivot joints, corresponding grossly to wrist, elbow and shoulder joints. Power actuators, commonly hydraulic rotary actuators, are affiliated with the several pivot joints of the manipulator and the operator inside the hull in observance of such manipulator through such as a window in the hull, controls operation of the several rotary actuators to dictate movements of the manipulator to obtain operation of the mechanical hand. The ease and rapidity with which the task of controlling operation of the manipulator is accomplished is greatly affected by the type of control system provided for the several actuators embodied in such manipulator.

Presently, the most common control means for each of the several actuators is a three-position control valve with two hydraulic lines to the respective actuator which are selectively connected to a source of hydraulic pressure for effecting movement of the actuator in respective directions, while the other of the two lines is connected to a return sump. A third position of the valve laps off the two hydraulic lines for maintaining a particular position of the respective actuator. To steer the manipulator hand, the operator decides what joint must be moved and then operates the respective control valve, usually on a one-joint-at-a-time basis. Once a given move has been decided upon, the operator must initiate the rate of motion by operating the proper control valve in the proper direction, visually monitor the effect the valve operation is having on manipulator position and then consciously terminate the movement by suitable valve operation. With employment of such on-off valve control, the result has been a fixed rate of speed of operation of a particular actuator, hence, particular rate of joint movement. The problem arising with fixed rate control is that a compromise must be reached between high speed operation of a given actuator (open for rapid slewing through wide angles) and low speed for fine control near the object to be grasped. As a result of this compromise, both rapid slewing and fine control are sacrificed in such conventional fixed-rate manipulator systems. This results in lost time in doing work with such a manipulator and increases the possibility of damage to the object to be grasped, or of damage to the manipulator.

Such conventional manipulators as employ on-off control valves mount such valves at a fixed location relative to the hull of the craft and remote from the actuators at the arms of the manipulator, and require an undue multiplicity of hydraulic lines of considerable length extending between the control valves and the actuators on the manipulator joints; two separate hydraulic lines being required for operation of each of the actuators so controlled by on-off selector valves. Such long lines tend to establish low resonant frequency conditions which introduce lags in response of the actuators to dictates of the control valves as well as pose a problem of suitable protection for all such lines during operation.

The on-off selector valves are usually of the poppet valve type which tends to introduce random and erratic high creep rates of the mnaipulator joints due to leak-by at the poppet valves which tend to become slightly unseated by particles of dirt which can accumulate on the seat.

Because of employment of such multiplicity of separate hydraulic lines between respective on-off selector valve devices and the actuators they control, these lines and actuator chambers to which they are connected tend to establish entrapped volumes of hydraulic fluid in lap position of the valves which can experience severe pressure changes at their exterior during ascent or descent of an undersea vehicle, which can cause implosion or explosion of hydraulic components as a result thereof.

In view of the foregoing remarks it is the prime object of the present invention to eliminate the above problems, either separately or collectively, i.e., to provide for adjusting the rate of operation of the manipulator joint actuators, to reduce the number of hydraulic lines employed for operation of the several actuators, to overcome the problem of implosion or explosion of hydraulic components during ascent or descent to and from great depths, to employ a control valve system which greatly reduces the tendency for leak-by within the valve responsible for creep of the actuators and manipulator joints, and to provide a simplification in construction and an increase in reliability and dexterity in performance of the system.

In general, the above object is obtained in the present invention by the provision of a manipulator apparatus which, in addition to the usual actuators mounted on the manipulator arm joints, also includes respective variable-rate electro-hydraulic servo valves mounted directly on the manipulator arm sections. The servo valves have only two hydraulic lines common to all of such valves and which extend therefrom to a hydraulic power supply system located externally of the hull of the craft on which the manipulator is mounted; each servo valve being constructed to minimize leakage between the hydraulic lines to the actuator as well as to provide for establishing interconnection between all hydraulic ports, passages, lines, etc., in the actuator system, including the hydraulic power supply, whereby internal hydraulic pressure becomes equalized with the environmental pressure of the system by way of ambient-pressure-compensated hydraulic supply system. Operator's control means disposed within the hull of the craft provides for electrical control of operation of the variable-rate electro-hydraulic servo valves by way of electrical lines passing through the hull of such craft.

Other objects, features, and advantages of the invention will become apparent from the following detailed description thereof, when taken in connection with the accompanying drawings, in which:

FIG. 1 is a schematic representation of a typical manipulator apparatus affiliated with an undersea vehicle or craft shown partially in cross-section and in elevation view;

FIG. 2 is a schematic representation of the control system for one particular actuator affiliated with one of the manipulator joints of the system shown in FIG. 1;

FIG. 3 is a schematic representation of the hydraulic system of the present invention including a hydraulic power supply portion and the arrangement of the several variable-rate electro-mechanical servo valve devices embodied in the system; and FIG. 4 is a schematic representation, substantially in cross-section, of a variable-rate electro-hydraulic servo valve device suitable for employment in multiple in applicants' novel manipulator apparatus.

Referring to FIG. 1 in the drawings, the exemplified manipulator is shown in affiliation with a spherical undersea craft and comprises a manipulator assemblage mounted on the exterior of the hull 11 immediately outside of an observers viewing window 12, and including a grasper or hand 13 at the projecting end of a multi-section arm 14 having wrist, elbow and shoulder joints 15, 16 and 17 and respective rotary actuators 18, 19 and 20 for such joints to provide for relative pivotal movement between adjacent components of the manipulator parts. One or more of the joints may also be rotatable about an axis perpendicular to that of the pivot joint to enhance the maneuverability of the manipulator arm; for example, the shoulder and wrist joints may embody such swivel feature. Within the hull there is an observers' pallet 22 to accommodate the operator 23 of the manipulator in a prone position with his face adjacent to the viewing window and to the control panel 24 for the manipulator disposed conveniently adjacent to the window for operation by the operator.

In accord with the features of the present invention, control of operation of the several hydraulic actuators 18, 19 and 20 of the manipulator is effected by respective variable-rate electro-hydraulic servo valve devices 26, 27 and 28 immediately adjacent to such actuators, respectively, and mounted on the same parts of the manipulator arm or assemblage on which the actuator housings are mounted, and these servo valve devices are controlled electrically from within the hull by way of electrical leads passing through the hull 11 and a control means 30 within the hull for controlling the on-off operation of the servo valves as well as the hydraulic output therefrom, as is shown for a particular actuator in FIG. 2.

In accord with another feature of the present invention, as shown in FIG. 3, the hydraulic supply system for the manipulator apparatus comprises a well-known hydraulic power supply 35 mounted outside the hull 11 and including a housing means 36 exposed to the ambient environment, the sea or space, for example, and enclosing a pump 37 operated by an electric motor 38 surrounded within the housing means 36 in a high dielectric strength liquid with a non-conducting, low-viscosity, high-dielectric-strength hydraulic fluid which provides suitable environment for the motor and may also be suitable for use as the hydraulic fluid availed to the pump for operation of the actuator system; the pump having an inlet open to a return sump defined by a housing 40 containing such fluid. Both the sump housing 40 and the motor-pump housing 36 have movable-abutment means 42 affiliated therewith, usually in the form of a piston compensator which is biased by a light spring 43 and exposed on one face to the enviromental pressure medium of the system, sea water for example. The piston compensators 42 permit the pressure within the pump-motor housing 36 and the accumulator housing 40 to vary automatically directly as the sea pressure varies, by virtue of the expansion and contraction of the interior of the two housings as permitted and provided by the piston compensators. The springs affiliated with the compensators, as illustrated in FIG. 3 are compression springs and maintain the pressure within the housing slightly above the environmental pressure of the seawater or space surrounding such housings to discourage the surrounding medium from leaking into these housings.

In accord with a feature of the present invention the servo valve devices are of a type which severally require only one common hydraulic supply line 45 and one hydraulic return line 46. The hydraulic supply line 45 originates at the output of the pump, and the hydraulic return line 46 terminates at the return sump, and the servo valve devices 26, 27 and 28 are connected in parallel in the system, one with respect to the other, between such supply and return lines. This minimizes the volume of hydraulic fluid required in the hydraulic lines of the system and makes the operation of the system stiffer and more responsive than previous systems employing a greater number of hydraulic lines; the hydraulic fluid having a certain compliance which affects the system according to the volume of such fluid therein.

In accord with another feature of the present invention, each of the hydraulic actuators is double-acting, and, referring to FIG. 4, may simply comprise a dual piston 50 arrangement having portions extending therefrom which are provided with racks or which constitute racks 51 having teeth meshing with pinion teeth on a portion of the output shaft 52. The housing 53 of the actuator is mounted on one of the relatively movable members affiliated with the manipulator and the output shaft 52 is attached to another of such members to obtain relative angular movements at a joint 15, 16, 17 therebetween during rotation of the output shaft by operation of the pistons. The two pistons 50 when subjected to a preponderance in hydraulic pressure in outer chambers 55 over that in a common inner chamber 56 will cause the racks 51 to advance inwardly for turning the output shaft 52 clockwise, while the reversal in the preponderance in hydraulic pressure in chambers 55, 56 at opposite sides of the pistons 50 will cause the pistons and their racks 51 to move outwardly and reverse the rotation of the output shaft. The rate at which hydraulic fluid is supplied to the 55 and 56 chambers, for any given load imposed on the output shaft 52 will determine the rate of turning of the output shaft and hence, of the rate of relative angular movement between the respective two adjacent members of the manipulator at a joint 15, 16 or 17 with which such actuator is affiliated. A passage 58 ported through the casing 53 of the actuator is in communication with the common chamber 56, while a second passage 59, together with its branches, and also ported through the casing 53 is connected to the two piston chambers 55. Other types of rotary actuators, and/or of linear actuators, might be employed in certain circumstances in lieu of that exemplified in FIG. 4.

Referring also to FIG. 4, in accord with a feature of the present invention, the servo valve device is of the electro-hydraulic type, i.e., it is controlled by an electrical signal and has an hydraulic output, and is of variable rate type with its output varying according to the level of the electrical signal employed for controlling it. In accord with the usual practice, it employs a torque motor portion 62 disposed within a housing part 63 to control a pilot pressure first stage for establishing a pressure differential, in one direction or the other according to direction of current flow, across a double-acting piston spool valve 65 to open up one or the other of the actuator lines 58, 59 to the supply line 45 while opening the other of such lines to the return line 46 a degree in accord with such differential in pilot pressure which in turn is dependent upon the level of current supplied to the torque motor. Thus, the rate of supply of hydraulic fluid for operation of the actuator in either particular direction is dependent upon the level of current supplied to the torque motor. A higher current at the torque motor will cause a greater displacement of the piston spool valve 65 in the selected direction and hence a wider opening of the respective supply and release communications to the actuator lines 58, 59 and a lesser current supplied to the torque motor will reduce the degree of opening of the actuator lines to the supply and release lines 45, 46 respectively.

In accord with well known practice, movement of the piston valve 65 is opposed by a leaf spring 67 which feeds back to the first stage to establish equilibrium between the pressure differential called for by the torque motor and position of the spool valve. The form that the torque motor 62 and first stage may take is exemplified in FIG. 4, wherein a jet pipe 70 is employed in such first stage of the servo valve device which direct hydraulic fluid from supply line 45 toward the two receiver ports 72 which experience hydraulic pressurization thereby. The jet nozzle 62 is pivotally moved in one direction or the other in an initial amount dependent upon the degree and polarity of current furnished to a control winding 74 on the armature 75 of the torque motor which is affiliated with such jet pipe 62 to create a differential in pressure between the two receiver ports 72, and hence across the piston spool valve 65. The resultant displacement of the spool valve to open one actuator line 58, 59 to a supply line port 45 and the other actuator line to the return line port 46 deflects the leaf spring 67 which delivers a force on the jet nozzle which balances the torque motor force to maintain the proper pressure differential across the spool valve. Upon return of the value of the current supplied to the control winding 74 in the torque motor 62 to a neutral value, usually zero, the jet nozzle will return to its position for establishing a pressure condition across the piston spool valve to cause it to assume its mid-position, in which it is shown, lapping off both actuator lines 58 and 59 from the supply and release line ports 45 and 46.

In accord with another feature of the present invention the piston spool valve 65, in its mid-position lapsoff the two actuator lines from both the hydraulic supply line ports 45 as well as the hydraulic return line port 46 by a considerable extent, such as about 50% of the full travel of the piston spool valve required to open the supply and return ports. This eliminates any significant leak-by between the two actuator lines 58 and 59 at the valve when the servo valve device is in operation.

In accord with another feature of the present invention, the piston spool valve 65 is provided with a relatively weak spring 80 which operates, upon equalization in pressure across the spool valve 65, coincidental with cut-off in current to control winding 74 and in supply pressure to the jet nozzle 70, to actuate such spool valve to the end of its travel in one direction as defined by engagement with a stop portion 81 of the housing to cause one of the actuator lines, line 58, to become connected to one of the supply ports 45 while the other of such lines, line 59, is connected to the return port 46. The effect of the light bias spring 80 on the piston spool valve 65 also carries the jet nozzle 70 to a right-hand position via leaf spring 67, and when the apparatus is again activated with start-up of the pump 37 and repressurization of the jet nozzle 70, the off-center nozzle 70 develops a preponderance in pressure on the right-hand end of the spool valve 65 to return it to its mid-position and to maintain it there against the light bias of spring 80.

The effect of such movement of the piston spool valve 65 to its extreme right-hand position under the influence of the light bias spring 80 to establish connection of the one actuator line 58 to the one supply port 45, and the other actuator line 59 to the return port 46 is to enable the pressures to equalize across the double acting piston 50 in the actuator, while at the same time establishing communication thereof with the ambient-pressure-compensated conditions existing in the hydraulic supply part of the apparatus. The supply pressure thus will be the same as the return pressure, and both will be automatically regulated by the piston compensators 42 to remain slightly above the ambient pressure of the sea or space surrounding the equipment. The result is that all chambers and passages within the equipment affiliated with the several actuators 18, 19, 20 and the several electro-hydraulic valve devices 26, 27, 28 associated therewith will have their pressures automatically maintained by the piston compensators 20 affiliated with the hydraulic power supply 35 by virtue of the respective connections in the servo valve devices which have had their piston valves 65 shifted, as above described, by the respective light bias springs 80. This eliminates the possibility of bottling-up volumes of hydraulic fluid which would experience considerable pressure change by virtue of the change in environmental pressure, as during ascent or descent over a relatively great depth range as in undersea equipment, for example.

In addition, the hydraulic medium employed in the servo system also encloses the electrical and magnetic portions of the torque motor 62 part of each servo valve. This is accomplished by connection of the interior of the cover cap 63 for such torque motor to the interior of the return sump chamber 40 by way of a common hydraulic line 85 which also contains the leads 86, 87 for the control windings of the torque motors. These leads then pass through a suitable sealed opening in the hull 11 of the craft, as shown in FIG. 3.

Referring to FIG. 2, the control winding 74 in each servo valve device, valve 28 alone being shown, is controlled by an on-off-reverse switch 88 which selects polarity of current supply to such winding 74 for effecting forward-reverse operation of the valve and its affiliated actuator, and a rate control rheostat 90 which determines the level of control current, hence rate of output from the valve and rate of operation of the actuator.

Having now described the invention, we claim:

1. In a manipulator system for use outside the hull of an undersea craft comprising an arm having articulated sections mounted at its one end to the hull of the craft and carrying at a projecting end a working tool, and having a plurality of hydraulic actuators mounted on the arm for effecting relative movement between the several arm sections, the combination therewith of an operating system for such actuators comprising a sea-pressure-compensated housing means containing a motor-operated-pump and a hydraulic return chamber open to the inlet of said pump, a common hydraulic supply line connected to the outlet from said pump, and a common hydraulic return line connected to said hydraulic return chamber, and a plurality of electro-hydraulic valve devices mounted on the manipulator arm sections for controlling operation of the aforesaid actuators, respectively, in selective directions and rates, each of such valve devices having supply port means connected to said common supply line and return port means connected to said common return line, and control means for such valve devices comprising a plurality of electrical lines respective to each valve device and extending therefrom to the interior of the hull of the craft, and respective electrical control means inside such craft for selective regulation of the control current supplied to the electro-hydraulic valve devices to control the operation thereof.

2. The manipulator system set forth in claim 1, wherein each hydraulic actuator comprises movable abutment means subject to pressure of fluid in opposite chambers, and each respective valve device comprises valve means movable to an actuator-protective position establishing communication between one of said opposite chambers and the common hydraulic supply line and between the other of said opposite chambers and the common return line, and means for effecting such movement of the valve means responsive to depressurization of the hydraulic supply line.

3. The manipulator system of claim 2, wherein each valve device comprises a torque-motor-operated first stage for controlling hydraulic actuation of a second stage piston-spool valve, which constitutes the aforesaid valve means, and a light bias spring acting on such piston-spool valve to effect its movement to the aforesaid actuator-protective position upon termination of hydraulic output pressure from said first stage.

4. The manipulator apparatus of claim 3 wherein, the piston-spool valve has a mid-position which laps-off the opposite chambers in the actuator one from the other and from the common hydraulic supply and return lines, said piston-spool valve being so proportioned longitudinally with respect to location of hydraulic supply and return ports as to overlap such ports in such mid-position by about 50% of the travel distance of such piston-spool valve required to uncover same.

References Cited
UNITED STATES PATENTS

| | | | |
|---|---|---|---|
| 1,979,782 | 11/1934 | Wiley et al. | 61—69 |
| 2,473,038 | 6/1949 | Rockwell | 91—459 X |

JACOB SHAPIRO, *Primary Examiner.*